United States Patent [19]
Vogel

[11] 3,778,707
[45] Dec. 11, 1973

[54] MEANS FOR MEASURING LOSS TANGENT OF MATERIAL FOR DETERMINING MOISTURE CONTENT

[75] Inventor: Ronald F. Vogel, Bettendorf, Iowa
[73] Assignee: Agridustrial Electronics, Inc., Bettendorf, Iowa
[22] Filed: Dec. 14, 1972
[21] Appl. No.: 315,149

[52] U.S. Cl............................................. 324/61 R
[51] Int. Cl............................................ G01r 27/26
[58] Field of Search....................... 324/61 R, 60 C

[56] References Cited
UNITED STATES PATENTS

| | | | |
|---|---|---|---|
| 3,340,400 | 9/1967 | Quittner.................... | 324/61 R X |
| 3,443,218 | 5/1969 | Jaggers et al. .............. | 324/61 R |
| 3,443,219 | 5/1969 | Adams...................... | 324/61 R |
| 3,443,220 | 5/1969 | Spademan.................. | 324/61 R |

*Primary Examiner*—Stanley T. Krawczewicz
*Attorney*—Glenn H. Antrim et al.

[57] ABSTRACT

A-c voltage is applied through two branches to respective input circuits of a phase detector. One of the branches includes a controlled phase shifter and a capacitive impedance circuit; the capacitive impedance circuit includes a moisture test cell and in the usual manner provides phase shift dependent upon the permitivity and loss factor of material placed in the moisture test cell. The overall shift in phase of the voltage in this branch of the circuit is therefore determined by the sum of the phase shift in the controlled phase shifter and the phase shift in the capacitive impedance circuit dependent on the sample in the moisture tester. The output of the phase detector is applied to a d-c control circuit of the controlled phase shifter to control the phase shift such that the sum of the phase angles of the phase shifter and the capacitive impedance circuit is maintained at a predetermined constant. The voltage on the output circuit for controlling the phase shifter is also the voltage that is applied to an indicator to determine moisture content according to the loss tangent of the material being tested. The output readings are substantially independent of the densities of the materials placed in the test cell.

4 Claims, 5 Drawing Figures

3,778,707

MEANS FOR MEASURING LOSS TANGENT OF MATERIAL FOR DETERMINING MOISTURE CONTENT

BACKGROUND OF THE INVENTION

This invention relates to testers for testing amounts of moisture in materials or products and particularly to testers for measuring loss tangent for indicating moisture content, the indication being independent of the density or packing of material in a test cell.

Testers of the capacitive type for measuring moisture content of materials placed between the electrodes of a capacitor are well known. Commonly, a cylindrical capacitor, comprising a container with a center electrode, is used for measurement of the moisture content of grain and other granular materials. The moisture content is determined from the electrical measurement of the permittivity or dielectric constant of the material placed between the electrodes. The electrical output reading that is a function of permittivity is not only dependent upon the moisture content of the material, but it is also dependent upon the density of the material between the electrodes. Since the density of granular materials in a test cell is obviously dependent upon the packing of the material, various arrangements have been used in conjunction with test cells to provide the same density in successive samples of materials placed in the cells. Commonly, moisture testers have means for weighing material to be placed in a hopper, means for positioning the hopper at a fixed position above the cell, and means for releasing the material from the hopper so that the material will be distributed evenly in the cell with the same density for a particular type of material. In Patent Application Ser. No. 152,186, filed on June 11, 1971, by Roy E. Resh and assigned to the assignee of this application, testers are described that are simpler in that they do not require hoppers because a simulated air gap is provided around the center electrode of each cylindrical cell, and a central spring means is provided for weighing the entire cell and the sample of material that is placed in the cell.

SUMMARY OF THE INVENTION

The present tester has a new electrical circuit for measuring moisture content sufficiently independent of variations of density to eliminate special equipment required to ensure even packing. The electrical circuit is especially desirable for use in continuous flow systems where consistent packing in the flow-through cell is very difficult to achieve.

The output indication derived from the circuitry is a function of the ratio of the real component of impedance to the imaginary component of the impedance of material in a test cell, the ratio commonly being called the loss tangent of the material. Since the magnitudes of both quantities of the ratio are dependent upon density, the ratio is substantially independent of density over a practical range, but it is still proportional to moisture content.

In general, the circuit comprises an a-c source, a phase detector, a controlled phase shifter, and a moisture test cell in a capacitive impedance circuit. The output of the a-c source is applied directly to one input of the phase detector, and is also supplied through the controlled phase shifter and the capacitive impedance circuit to the other input of the phase detector. The dielectric and loss characteristic of samples of material placed between the electrodes of the test cell determine the phase shift through the capacitive impedance circuit. The output of the phase detector is connected to a control input of the phase shifter to control the phase of voltage applied to the input of the capacitive impedance circuit. The amount of voltage applied to this input of the phase shifter is sufficient to cause a controlled degree of phase shift to compensate for the variations in phase shift across the capacitive impedance circuit such that the difference in phase of the voltages derived from the a-c source is constant where the voltages from the two branches are applied to the respective inputs of the phase detector. This control voltage is shown to be proportional to the loss tangent of the materials being tested, and it is this voltage that is applied to an indicator circuit for determining the moisture content of the materials in the test cell.

DESCRIPTION OF THE PREFERRED EMBODIMENT

Prior apparatus commonly used for measuring moisture contents of materials provides output readings that are the function of the flow of alternating current through the material in response to the application of a-c (alternating-current) voltage to an impedance circuit including the test cell. If the test cell and its contents had pure capacitive characteristics, the phase of the current through the cell would obviously lead the phase of the voltage applied directly across the cell by 90°, but according to the amount of dielectric loss in the material being tested, the current leads by an angle less than 90°. Mathematically, the current is customarily represented as having an imaginary component that leads the voltage by 90° and a real component that is in phase with the voltage. Rather than measuring the actual current or the vector sum of the components, the present circuit measures the ratio of the real component to the imaginary component of the current flow through the cell. This ratio is the tangent of the complementary angle of the phase angle by which the current leads the voltage, and is commonly called the loss tangent of the material.

Figure 1:
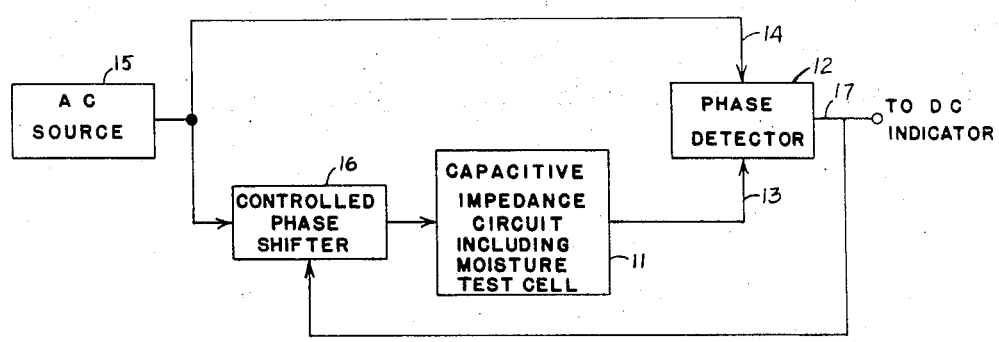
FIG. 1 is a block diagram of the fundamental circuit used for measuring loss tangent for indicating moisture content of the material being tested.

The circuit represented in FIG. 1 provides an output as a function of the loss tangent of the materials being tested, and is substantially independent of variations in density caused by the degree of uneven packing that results when special precautions are not observed to measure the material and to spread it evenly in the test cell. A test cell such as that shown in U.S. Pat. Application Ser. No. 152,186 to which reference has been made above, is included in the capacitive impedance circuit 11. The difference in phase between the input and the output voltages of the capacitive impedance circuit is a function of the dielectric properties or moisture content of the material in its test cell.

The phase detector 12 has an input circuit 13 connected to the output circuit of the capacitance impedance circuit 11 and has another input circuit 14 connected directly to an a-c source 15. The phase detector 12 provides in the usual manner a direct-current output voltage proportional to the difference in phase of the voltages applied to the input circuits 13 and 14 of the phase detector. As described below, by maintaining the phase differences between the input voltages constant, preferably at substantially 90°, the output of the phase detector is proportional to the loss tangent of the material being tested, and therefore, the output may be connected to an electrical indicator circuit for displaying the moisture content of the material being tested substantially independent of the density of the material in the test cell.

An a-c source 15 is connected through a first branch to the input circuit 14 of the phase detector 12 to provide a reference for the phase of the voltage applied through a second branch to the other input circuit 13 from the capacitive impedance circuit 11. The second branch of a circuit extending from the a-c source 15 includes a controlled phase shifter 16 in cascade with the capacitance impedance circuit 11. The output circuit 17 of the phase detector 12 is connected to a control input circuit of the controlled phase shifter 16. In order to maintain the phase difference between the input circuits 13 and 14 of the phase detector 12 at a phase angle of substantially 90°, the amount of phase shift provided by the controlled phase shifter 16 must correspond to an angle that has a tangent proportional to the loss tangent of the material being tested in the moisture test cell within the circuit 11.

Figure 2:
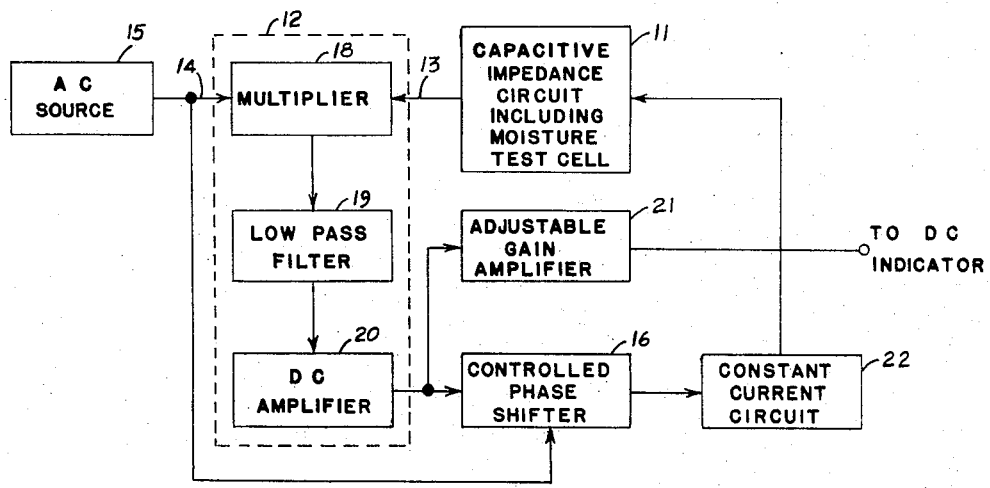
FIG. 2 is a block diagram of electronic stages in a particular embodiment to implement the circuit shown in FIG. 1.

In a preferred embodiment, the general circuit shown in FIG. 1 has been implemented by the electronic stages shown in FIG. 2. The phase detector 12 of FIG. 1 is shown in FIG. 2 as a multiplier 18, a low-pass filter 19 connected in the output circuit of the multiplier 18, and a d-c amplifier 20 having its input connected to the low-pass filter 19. Like the output connection of the phase detector 12 of FIG. 1, the output of the d-c amplifier 20 is connected to a control input of the controlled phase shifter 16; and the output of the amplifier is also connected through an adjustable gain amplifier 21 to a circuit for a d-c indicator. In order to indicate clearly that the capacitive impedance circuit including the moisture test cell 11 of FIG. 1 provides nearly constant a-c current to the moisture test cell, a constant current circuit 22 has been shown connected in the output circuit of the controlled phase shifter 16 that is connected to the capacitive impedance circuit 11.

Figure 3:
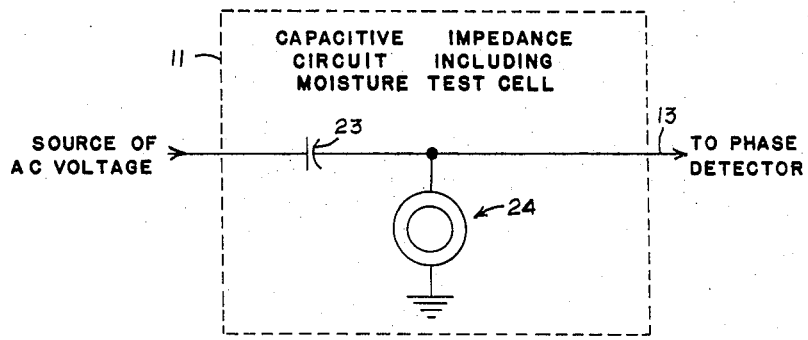
FIG. 3 is a schematic diagram of a capacitive impedance circuit including a moisture test cell suitable for use in the appropriate block shown in either FIG. 1 or FIG. 2.

Usually, the simple circuit shown in FIG. 3 is adequate for the capacitance impedance circuit 11 of FIGS. 1 and 2 to provide phase shift according to the permittivity of material placed in the test cell. Voltage from the a-c source 15 is applied through a capacitor 23 to the inner electrode of a moisture test cell 24. The outer electrode or container of the test cell 24 is connected to a common circuit or ground in a conventional manner. The inner conductor of the test cell 24 is connected to the input circuit 13 of the phase detector 12 of FIG. 1 or to the corresponding input of the multiplier 18 of FIG. 2. The capacitance of the series capacitor 23 is small relative to the capacitance of the test cell 24 so that its reactance substantially determines a substantially constant flow of alternating current to the test cell 24.

Figure 4:
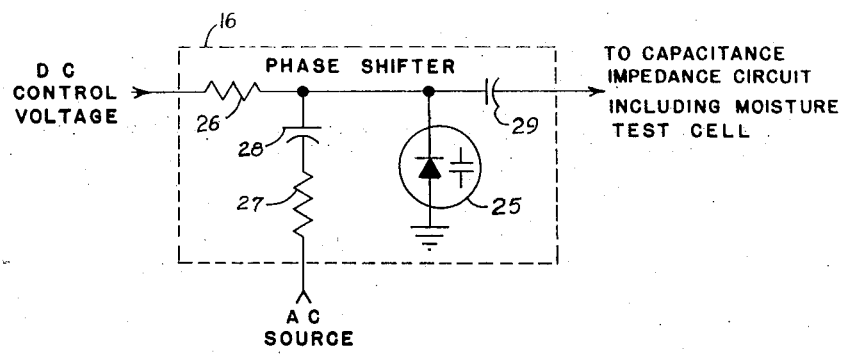
FIG. 4 is a schematic diagram of a phase shifter to be used in the appropriate block shown either in FIG. 1 or FIG. 2.

Different types of phase shifters can be used satisfactorily for the controlled phase shifter 16 of FIGS. 1 and 2. A phase shifter that is preferred because it is simple is shown in FIG. 4. A capacitive diode 25 is connected through a resistor 26 to the circuit for applying d-c control voltage, and the variation of the capacitance of the diode as a function of the control voltage determines the change in phase of the voltage through the phase shifter. With reference to FIG. 2, the d-c control voltage circuit of the phase shifter 16 of FIG. 4 is connected to the output circuit of the d-c amplifier 20. This control circuit in FIG. 4 includes a dropping resistor 26 connected to one electrode of the capacitive diode 25, and the other electrode of the diode is connected to a common circuit or ground. An a-c input circuit of FIG. 4 is connected to the a-c source 15 of FIG. 2, and it includes a resistor 27 and a capacitor 28 in series with the capacitive diode 25. The electrode of the capacitive diode 25 that is connected to the capacitor 28 and the resistor 26 is also connected through a coupling capacitor 29 to the moisture test cell included in the capacitive impedance circuit 11.

With reference to FIG. 2, the circuit for measuring loss tangent of materials functions according to the following mathematical analysis. The signal at the output of the a-c source 15 is represented as $E_1 \sin wt$, and the signal at the output of the capacitive impedance circuit 11 including the moisture test cell is represented as $E_2 \sin(wt + \theta)$. Where $E_1$ and $E_2$ represent values of peak voltages, $w$ represents the angular frequency of the voltage from the a-c source 15, $t$ represents time, and $\theta$ represents an additional phase angle by which the signal from the a-c source 15 is shifted in the branch of the a-c circuit that includes the phase shifter 16 and the capacitive impedance circuit 11. The output of the multiplier 18 is $E_1 E_2 \sin wt \sin(wt + \theta)$, and after substituting a trigonometric identity, the expression becomes $$-\tfrac{1}{2} E_1 E_2 [\cos(2wt + \theta) - \cos 74].$$

After passing through the low-pass filter 19, the signal applied to the input of the d-c amplifier 20 is $\tfrac{1}{2} E_1 E_2 \cos \theta$. Since the d-c amplifier 20 has high gain, and since the amount of voltage to be applied to the phase shifter 16 is relatively low, the input of the d-c amplifier 20 can be considered to approach zero, and to approach zero, the angle $\theta$ must approach 90°.

Let $b$ be associated with the controlled phase shifter 16 and be electronically variable, then the transfer function of the phase shifter 16 is $1 - jb$, $j$ being the usual imaginary operator. Where $A_1$ is a function of the constant current circuit 22 and the size of the moisture test cell in the capacitive impedance circuit 11, and $C_r$ and $C_i$ are the real and imaginary components respectively of the capacitance of the test cell, the total transfer function from the output of the a-c source 15 to the output of the phase shifter 60 is $$A_1 (1 - jb) /(j + C_i/C_r).$$

Since the angle of this transfer function must be the angle $\theta$ which because of the characteristics of the d-c amplifier and the phase shifter 16 approach 90°, the expression $$A_1 (j + b)/(j + C_i/C_r)$$

must be real, and $b = C_i/C_r$.

Since the output voltage to be applied to a d-c indicator from the adjustable gain amplifier 21 is a function of $b$, it is also a function of the ratio $C_i/C_r$ which is determined by the loss tangent of a sample in the test cell 24 of the capacitive impedance circuit 11.

Figure 5:
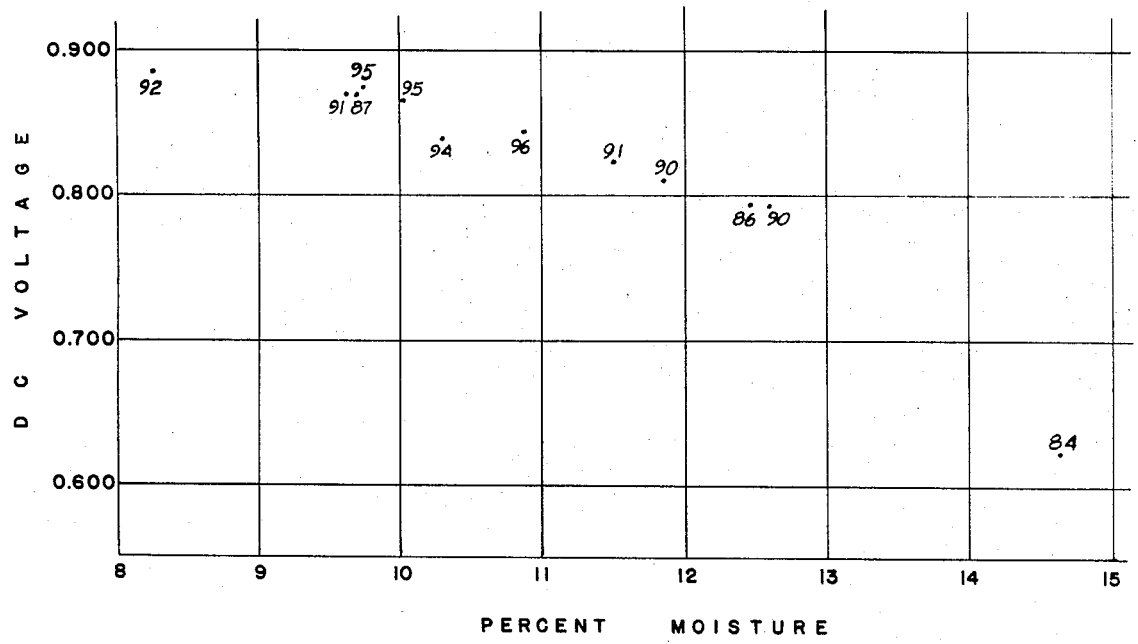
FIG. 5 is a graph showing output voltage for different percentages of moisture in samples of wheat having densities indicated by the numbers near the respective points plotted on the graph.

The correlation of the percentage of moisture in samples of hard wheat and the loss tangent as measured in the output of the adjustable gain amplifier 21 of FIG. 2 is shown in the graph of FIG. 5. The figures for densities shown near the respective points plotted for the different samples, are their specific gravities with their hundredths decimal points omitted. The correlation between the densities and the voltage output of the adjustable gain amplifier 21 is obviously low; whereas, the output reading decreases consistently in proportion to the percentage of moisture of the samples.

Since the different densities of the different samples have little effect on the output loss-tangent reading, the accurate measurements by weight and volume of samples to be placed in the container of a test cell are no longer required, and therefore, the spring scale means for measuring weight and the hopper with means for distributing the sample in the test cell are no longer required. However, the greatest usefulness of the circuit is in continuous-flow capacitive test devices where the sample flows through the device to provide a continuous reading for moisture of material being conveyed. In continuous moisture testers where constant density cannot be achieved, the present circuit measures moisture content accurately when the flow is controlled by usual, simple means.

I claim

1. Electrical circuit means for testing loss tangent of material substantially independent of the density of a sample being tested comprising:

a test cell of the capacitive type having first and second electrodes with a space therebetween for receiving material to be tested, a capacitive impedance circuit including said electrodes, said capacitive impedance circuit having an a-c input circuit and an a-c output circuit, the difference in phase between a-c voltage in said a-c input circuit and the resulting a-c voltage in said a-c output circuit being a function of the permittivity and loss factor of material placed between said electrodes, a controlled phase shifter having an a-c input circuit, a control input circuit, and an a-c output circuit, a phase detector having first and second a-c input circuits and an output circuit, said phase detector responsive to application of a-c voltages to its input circuits to supply voltage from its output circuit proportional to the difference in phase of the a-c voltages applied to its input circuits, the output circuit of said phase detector being connected to said control input circuit of said phase shifter, an a-c source, first and second branch circuits connected from said a-c source to said first and second a-c input circuits respectively of said phase detector, said second branch circuit including said controlled phase shifter and said capacitive impedance circuit connected in cascade through their respective a-c input circuits and a-c output circuits, said controlled phase shifter responding to voltage applied from said output circuit of said phase detector to its control input circuit to maintain a substantially predetermined angle of phase between the voltages applied from said first and second branch circuits to said first and second input circuits respectively, and a voltage indicator circuit connected to the output circuit of said phase detector, the voltage developed in the output circuit of said phase detector being proportional to the loss tangent but being substantially independent of the density of material placed between said electrodes of said test cell.

2. Electrical circuit means as claimed in claim 1 wherein said phase detector includes a multiplier, a low-pass filter and a d-c amplifier, said multiplier having an output circuit and first and second input circuits, said first and second input circuits of said multiplier being said first and second a-c input circuits respectively of said phase detector, the first input circuit of said multiplier being in said first branch circuit connected to said a-c source, said second input circuit of said multiplier being in said second branch circuit and being connected to said a-c output circuit of said capacitive impedance circuit, said output circuit of said multiplier being connected through said low-pass filter to the input circuit of said d-c amplifier, and the output circuit of said d-c amplifier being the output of said phase detector, the output circuit of said d-c amplifier being connected to said a-c input circuit of said phase shifter and to said voltage indicator circuit.

3. Electrical circuit means as claimed in claim 1 wherein said voltage indicator circuit in said output circuit of said phase detector includes an adjustable gain amplifier, said adjustable gain amplifier having an input circuit connected to said output circuit of said phase detector and an output circuit for connection to an indicator.

4. Electrical circuit means as claimed in claim 2 wherein said controlled phase shifter and said phase detector maintain said predetermined angle of phase at substantially 90°.

* * * * *